US006715843B2

(12) United States Patent
Teague

(10) Patent No.: US 6,715,843 B2
(45) Date of Patent: Apr. 6, 2004

(54) WHEEL MOUNTING ASSEMBLY AND METHOD

(75) Inventor: Norman Kent Teague, Wichita Falls, TX (US)

(73) Assignee: Kent's Tire Service, Inc., Wichita Falls, TX (US)

( * ) Notice: Subject to any disclaimer, the term of this patent is extended or adjusted under 35 U.S.C. 154(b) by 0 days.

(21) Appl. No.: 10/066,858

(22) Filed: Feb. 4, 2002

(65) Prior Publication Data

US 2003/0146656 A1 Aug. 7, 2003

(51) Int. Cl.[7] .............................. B60B 1/00; B60B 25/00; B60B 27/00
(52) U.S. Cl. ............................ 301/35.621; 301/35.627; 301/105.1
(58) Field of Search ................... 301/35.61, 35.621, 301/35.622, 35.623, 35.624, 35.625, 35.626, 35.627, 35.629, 35.631, 35.632, 105.1; 188/17, 18 R, 218 R

(56) References Cited

U.S. PATENT DOCUMENTS

| 1,380,925 A | * | 6/1921 | Putnam ................. 301/35.621 |
| 2,067,008 A | * | 1/1937 | Fergueson ............... 301/105.1 |
| 3,329,468 A | * | 7/1967 | Beith ..................... 301/35.631 |
| 3,664,708 A | * | 5/1972 | Verdier .................. 301/35.632 |
| 3,749,450 A | * | 7/1973 | Senter et al. ........... 301/35.631 |
| 3,759,576 A | * | 9/1973 | Richter .................. 301/35.629 |
| 3,988,038 A | * | 10/1976 | Hedlund ................ 301/35.629 |
| 4,165,904 A | * | 8/1979 | Reppert ................. 301/35.631 |
| 4,708,397 A | * | 11/1987 | Weinmann ............ 301/35.632 |
| 4,811,992 A | * | 3/1989 | Steiner .................... 301/105.1 |
| 4,971,498 A | | 11/1990 | Goforthe |
| 5,454,628 A | * | 10/1995 | Maiworm et al. ............ 301/65 |
| 6,070,946 A | | 6/2000 | Holmes |

OTHER PUBLICATIONS

Web pages from Accuridecorp.com—Hub–Piloted Tubeless Wheels www.accuridecorp.com/products/hubpilot.pdf, pp. 5–12, Jan. 4, 2002.

* cited by examiner

Primary Examiner—S. Joseph Morano
Assistant Examiner—Jason R. Bellinger
(74) Attorney, Agent, or Firm—Grady K. Bergen

(57) ABSTRACT

In a hub-piloted wheel mounting assembly, relative movement between a hub and drum, which can cause a wheel and tire to become out of balance, is prevented. The hub has at least one bolt extending from it and the drum has an oversized aperture for receiving the bolt so that an area of space between the bolt and the sides of the aperture is created. A spacing insert having a body with a bore for closely receiving the bolt and which is configured to be closely received within the aperture of the drum is provided to prevent relative movement of the bolt within the aperture. This prevents shifting or slippage of the drum with respect to the hub and keeps the wheel and tire in balance.

17 Claims, 2 Drawing Sheets

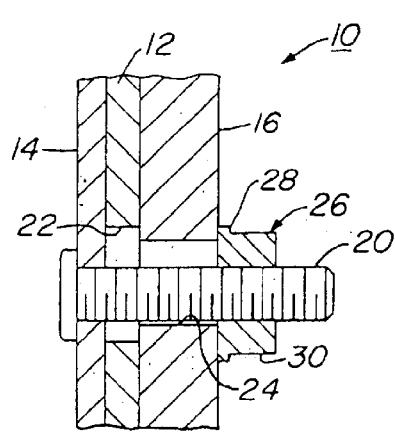
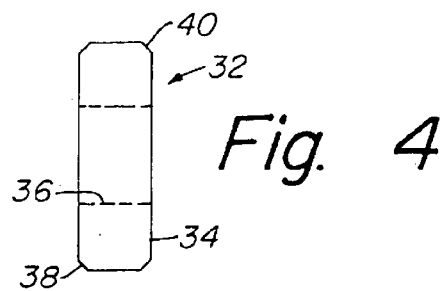
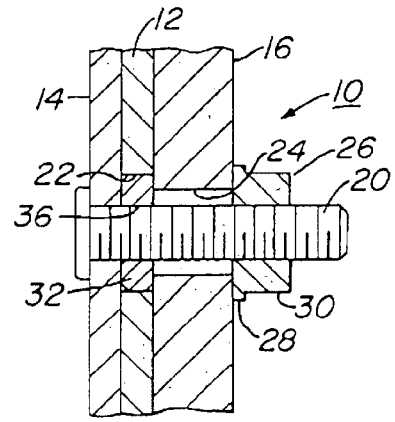
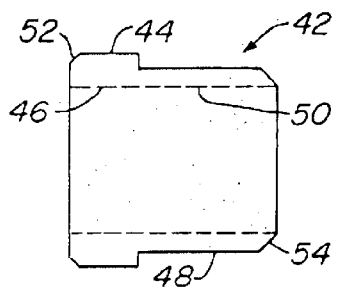
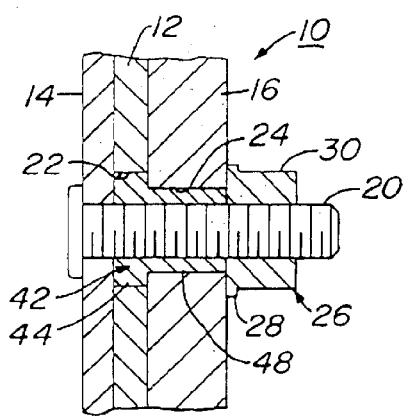

WHEEL MOUNTING ASSEMBLY AND METHOD

TECHNICAL FIELD

The invention relates generally to vehicles, and more particularly to wheel mounting assemblies for such vehicles.

BACKGROUND

Present day automotive vehicles typically employ wheel mounting assemblies utilizing a hub to which the wheel and tire of the vehicle are secured by means of several threaded bolts, often referred to as "studs" or "lugs," which extend from the hub. These bolts are usually configured in a circular arrangement and extend through bolt holes formed in the wheel. A threaded nut or "lug nut," which threads onto each bolt, is then used to fasten the wheel onto the hub. There are different variations of such mounting assemblies. The two most common mounting systems are the stud-piloted and hub-piloted mounting systems.

In a stud-piloted mounting assembly, the bolt holes formed in the wheel for receiving the studs are usually chamfered or beveled at their openings. Likewise, the lug nuts used for such mounting systems are also usually chamfered or beveled to provide a generally frusto-conical shape that generally corresponds to the chamfered or beveled area of the bolt hole. Thus, when the lug nuts are tightened onto the stud to secure the wheel in place, the chamfered or beveled portion of the lug nut extends into and seats against the corresponding chamfered portion of the bolt hole of the wheel. The studs are arranged so that when the wheel is mounted and the lug nuts are tightened, the studs are centered within each bolt hole to facilitate aligning and centering of the wheel on the hub.

One of the problems associated with the stud-piloted mounting assemblies, however, is that the studs and nuts are subjected to very high loads and stresses, and thus subject to failure.

In hub-piloted mounting assemblies, the wheel is aligned or centered on the hub itself. The hub is provided with hub pilots or guide members to facilitate centering the wheel on the hub. The bolt holes of the wheel and the lug nuts of hub-piloted mounting assemblies are not chamfered or beveled, as in the stud-piloted mounting systems. Instead, the lug nut is usually provided with a flat-faced flange or washer portion which abuts against the face of the wheel immediately surrounding the bolt hole. The hub-piloted design eliminates much of the stresses placed on the studs and lug nuts that are encountered in stud-piloted mounting systems. The hub-piloted wheel mounting assemblies are often found on trucks, trailers and the like used for hauling large or heavy loads.

Brake drums may be employed with some wheels and incorporated into the mounting assemblies. In the hub-piloted assembly employing a brake drum, the drum is mounted over the hub. Lug holes or apertures are provided in the drum to allow the passage of the lugs or bolts therethrough. In most cases, the apertures have a diameter that is much greater than the diameter of the lugs or bolts. The wheel of such mounting assemblies incorporating a brake drum is mounted over the brake drum and hub and secured in place by lug nuts. When the lug nuts are tightened, the brake drum and wheel are secured and held in place against the hub.

In hub-piloted mounting assemblies, it is not uncommon for the drum to slip or shift with respect to the hub after the wheel has been mounted. This slippage is due to the oversized apertures of the hub-piloted mounting assemblies that accommodate the lugs. The drum is prevented from shifting only by the frictional forces between the interfacing hub and drum. Even when the lug nuts are fully tightened, slippage of the drum may occur. Tightening the lug nuts may further increase these frictional forces to facilitate holding the drum in place, but over tightening of the lug nuts beyond specification may result in failure of the threaded lug nut or lug or both. Further, the large forces often encountered by vehicles while on the road, especially large trucks and trailers, are often great enough to cause the drum to shift no matter how tight the lug nuts.

Slippage of the drum tends to cause the wheel to be off center and out of balance. Even if the tires and wheels are initially balanced after being mounted, the drum may shift or slip during use so that they are soon out of balance. When the tire and wheel is out of balance, vibration and premature tire wear are usually the result. In extreme cases, handling of the vehicle can be impaired and severe tire damage may result, increasing the chances of a dangerous blow out, tread loss or flat.

As can be seen, improvements in such wheel mounting assemblies are needed.

SUMMARY

A wheel mounting assembly is provided. The wheel mounting assembly includes a hub having at least one bolt extending therefrom. A drum having an aperture receives the at least one bolt. The aperture has a width that is substantially greater than that of the lug or bolt to thus define an area of space between the bolt and the sides of the aperture. The assembly also includes a spacing insert having a body with a bore for closely receiving the at least one bolt. The body is configured to be closely received within the aperture of the drum so that the area of space is generally filled by the spacing insert when positioned therein.

A device for preventing relative movement of a drum and hub of a wheel mounting assembly is also provided, wherein the hub has at least one bolt extending therefrom which extends through an aperture of the drum and a bolt hole of the wheel when the drum and wheel are mounted thereon, and wherein the aperture has a width that is substantially greater than that of the at least one bolt thus defining an area of space between the bolt and the sides of the aperture. The device includes a spacing insert having a body with a bore for closely receiving the at least one bolt. The body is configured to be closely received within the aperture of the drum so that the area of space is generally filled by the spacing insert when positioned therein to thereby restrict relative movement of the bolt within the aperture.

A method of preventing relative movement of a drum and hub of a vehicle wheel mounting assembly is further provided, wherein the hub has at least one bolt extending therefrom over which the drum is mounted, and wherein the drum has an aperture with a width that is substantially greater than that of the at least one bolt to thus define an area of space between the bolt and the sides of the aperture. The method includes providing a spacing insert formed from a body having a bore for closely receiving the at least one bolt. The body is configured to be closely received within the aperture of the drum. The body of the spacing insert is inserted into the aperture so that the area of space is generally filled by the body when positioned therein to thereby prevent relative movement of the bolt within the aperture.

In certain embodiments, the spacing insert may have a sleeve portion extending from the body. The sleeve portion has a bore for closely receiving the at least one bolt and is configured to be closely received within the bolt hole of a wheel of the assembly.

BRIEF DESCRIPTION OF THE DRAWINGS

For a more complete understanding of the present invention, and the advantages thereof, reference is now made to the following descriptions taken in conjunction with the accompanying figures, in which:

FIG. 3 is a cross-sectional view of a hub-piloted wheel mounting assembly, showing a lug extending through an aperture of the brake drum and bolt hole of a wheel, with the lug being off center and out of alignment;

FIG. 4 is an elevational view of a spacing insert for use with the wheel mounting assembly of FIG. 3, which is shown constructed in accordance with the invention;

FIG. 5 is a cross-sectional view of the wheel mounting assembly of FIG. 3 with the spacing insert of FIG. 4 positioned within the aperture of the brake drum, and constructed in accordance with the invention;

FIG. 6 is an elevational view of another embodiment of a spacing insert constructed in accordance with the invention; and FIG. 7 is a cross-sectional view of a wheel mounting assembly employing the spacing insert of FIG. 6, and constructed in accordance with the invention.

DETAILED DESCRIPTION

Figure 1:
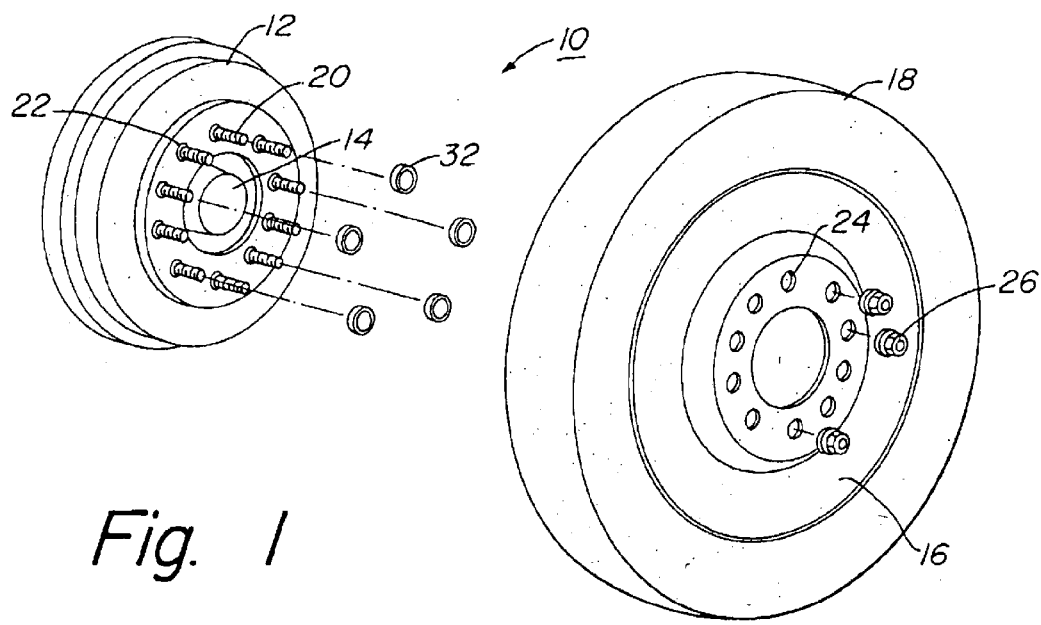
FIG. 1 is an exploded perspective view of a hub-piloted wheel mounting assembly employing a brake drum and a plurality of spacing inserts for use with the brake drum, and which is constructed in accordance with the invention.

Referring to FIG. 1, a wheel mounting assembly 10, such as used on a tractor/trailer, is shown. The wheel mounting assembly 10 shown is a hub-piloted wheel mounting assembly. The invention may have application to other types of wheel mounting assemblies of similar construction or design having the same limitations, however, as will be discussed in further detail. The mounting assembly 10 employs a brake drum 12 mounted to a hub 14. The hub 14 is provided with hub pilots or piloting members (not shown) to facilitate mounting of a wheel 16 and tire 18.

Mounted to the hub 14 and extending therefrom is a plurality of externally threaded bolts or studs 20. The bolts 20 are configured in a generally circular arrangement, with each being circumferentially spaced apart from the other. In the embodiment shown, there are ten bolts. Wheel mounting assemblies for most trucks and trailers will typically have 8 to 10 bolts. The number of bolts used for a particular mounting assembly may vary more or less, however.

The bolts 20 are received and extend through apertures 22 formed in the drum 12 when the drum is mounted to the hub 14. The apertures 22 are arranged in a corresponding circular arrangement and have a width or diameter that is substantially greater than the width or diameter of the bolts 20. As used herein, the term "width" shall be construed to mean the greatest crosswise dimension. The difference between the width of the bolt 20 and aperture 22 is typically around ¼ inch. This difference may vary, however, from about ⅛ to ½ inch or greater.

Bolt holes 24 likewise are formed in the wheel 16 and receive the bolts 20 when the wheel 16 is mounted to the hub 14 and drum 12. While only one wheel and tire are shown for the hub 14 and drum 14, the mounting assembly may include multiple wheels, such as dual-wheel assemblies having an inner and outer wheel, which are commonly used on many trucks and trailers.

Internally threaded lug nuts 26 are provided for each of the bolts 20. The lug nuts 26 are of the type commonly employed with hub-piloted wheel mounting systems in that they are not provided with a chamfered or beveled end portion, but instead are flat faced for abutting against the flat outer surface of the wheel 16 immediately surrounding the bolt hole 24. In this respect, the lug nuts 26 are each provided with a flat-faced washer portion or flange 28, which is integrally joined with a head 30 and has an abutment surface that lies in a plane generally perpendicular to a longitudinal axis of the bolt 20 to which it is fastened. The head 30 is configured with nut flats, usually in a hexagonal arrangement, for engagement with a wrench or tool to facilitate tightening and loosening of the lug nut 26.

Figure 2:
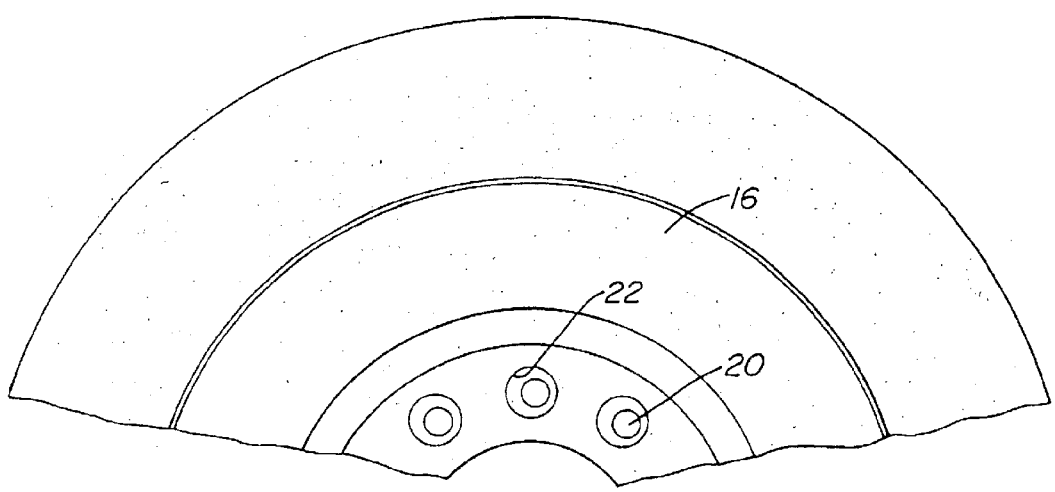
FIG. 2 is a partial elevational view of a brake drum mounted on a hub of the wheel mounting assembly of FIG. 1 without spacing inserts, showing lugs of the mounting assembly extending through apertures of the brake drum, which are each off center.

Because of the difference in widths or diameter of the bolts 20 and apertures 22 of the brake drum 12, an area of space between the bolt 20 and the sides of the aperture 22 is created that permits relative movement of the bolt 20 within the aperture 22. This allows the bolts 20 to become off center within the aperture 22, as shown in FIGS. 2 and 3, and which leads to the wheel being out of balance. In a typical mounting assembly, when the bolt 20 is centered within the aperture 22, the clearance or gap between the bolt 20 and the sides of the aperture 22 may be about ⅛ inch. Thus, when the bolt 20 shifts, it can leave as much as a ¼ inch gap. If the bolt 20 is not centered initially, but is positioned to one side of the aperture 22, the bolt may shift as much as ¼ inch to the opposite side. The later shifting of the drum and wheel by such a degree can throw the wheel off balance by not merely ounces, but pounds. This can have drastic effect, affecting the handling of the vehicle as well as resulting in damage to the tire.

In accordance with the invention, a spacing insert or member 32 (FIG. 4) is provided with the wheel mounting assembly 10. The spacing insert 32 is formed from a metal body 34, such as hardened steel, having a central bore 36. The body 34 is configured to be closely received within the apertures 22. Likewise, the bore 36 is configured to closely receive the bolts 20. In this regard, the body 34 will usually be generally cylindrical in shape having a continuous cylindrical wall to correspond to the circular shape of the aperture 22 and circular cross section of the bolt 20. It should be apparent to those skilled in the art, however, that other configurations may be used. For example, the body 34 may be formed in one or more sections that are positioned around the bolt 20 and within the aperture 22. The body 34 may be in the form of a non-continuous wall, such as in a U- or C-shape, but that still prevents relative movement of the hub and drum, as is described later on. Additionally, the shape or configuration of the body 34 may vary depending upon the particular shape and design of the mounting assembly structures for which it is used, such as would be the case if a polygonal- or oval-shaped aperture where employed with the drum 12.

Desirably, the exterior of the body 34 should be configured to provide a snug fit within the aperture 22. A clearance of from 0.001 to 0.005 is suitable in most instances, but may vary. In the particular embodiment shown for a conventional brake drum, the width or diameter of the aperture 22 is about 1¼ inches, ±0.005 inches, which is common diameter for brake drums used on hub-piloted wheel mounting assemblies of present-day vehicles. The width or outer diameter of the body 34 may range, however, from about ¾ to about 1¾ inches, with from 1.0 to about 1.5 inches being more typical, and from 1.1 to 1.3 inches being still more typical. Of course, the outer width or diameter of the body 34 may vary depending upon the size and shape of the aperture.

Likewise, the bore 36 is desirably configured to provide a snug fit around the bolt 20. A clearance of from 0.001 to 0.005 inches is suitable in most instances, but may vary as well. The width or diameter of the bore 36 may range typically from about 0.5 to 1 inch, with from 0.85 to about 0.9 inches being more typical. In the particular embodiment shown for a conventional stud 20, the width or diameter of the bore 36 is approximately ⅞ inches, ±0.005 inches, which is suitable for bolts or studs of present-day wheel mounting assemblies of similar size. The bore 36 is centered or positioned so that when the body 34 is inserted into the aperture 22 and the lug extends through the bore 36, the lug or bolt 20 will be generally centered within the aperture 22.

Desirably, the height or thickness of the body 34 is generally equal to or less than the thickness of the wall of the aperture 22 with which it is employed. This allows the body 34 to be flush with or recessed from the outer surface of the brake drum 12. This is to ensure that it does not project beyond the outer surface of the brake drum 12 to interfere with the wheel 16 when the wheel 12 is mounted to the hub 14 and drum 12. Of course, the thickness of the body 34 will vary depending upon the wall thickness of the aperture 22, however. Typical thicknesses may range from 0.1 to 0.5 inches, with from 0.15 to 0.4 inches being more typical. In the particular embodiment shown, the thickness is approximately 0.35 inches.

As shown in FIG. 4, the body 34 has chamfered or beveled outer edges or corners 38, 40. This facilitates ease of insertion of the body 34 into the aperture 22. It also helps keep the corners from turning or rolling, which could limit or prevent insertion of the body 34 into the aperture 22.

Referring to FIG. 5, a cross section of a portion of the mounting assembly 10 employing a spacing insert 32 is shown. With the wheel 16 and tire 18 removed and the drum 12 mounted over the hub 14, a spacing insert 32 is selected that is of appropriate size and configuration for use with the particular wheel assembly and is positioned within the aperture 22, with the lug or bolt 20 passing through the bore 36. As can be seen, the insert 32 substantially fills the entire space surrounding the lug 20 within the aperture 22, keeping the lug 20 centered within the aperture 22. After the insert 32 is positioned within the aperture 22, the wheel 16 and tire 18 are then mounted to the hub 14 and drum 12 in a conventional manner. The lug nuts 26 are threaded over the bolts 20 and tightened to secure the wheel 16 in place.

Desirably, more than one insert 32 is used with each wheel mounting assembly. As shown in FIG. 1, the wheel assembly 10 is shown having ten bolts or lugs 20, with five spacing inserts 32 being used, one insert being used for every other bolt 20. Desirably, the inserts are positioned to facilitate balancing of the wheel and tire. For instance, if four inserts 32 are used, they may be positioned approximately 90 degrees apart. Likewise, if only two inserts 32 are used these may be positioned approximately 180 degrees apart. The use of more than one insert 32 keeps the remaining bolts or studs 20 centered within the apertures 22, even though there may be no inserts provided in some of the apertures of the drum.

FIG. 6 shows another embodiment of a spacing insert indicated at 42. The insert 42 is generally similar in construction to the insert 32, previously described; having a body 44 with a central bore 46. The insert 42 also includes a sleeve portion 48, which extends from the body 44. The sleeve portion 48 is shown having an outer width or diameter that is less than that of the body 44. The exterior of the sleeve portion 48 is generally cylindrical in shape and/or is configured to be closely received within the bolt hole 24 of wheel 16, as shown in FIG. 7. The height of the sleeve portion 48 is sufficient so that the sleeve 48 projects at least partially into the bolt hole 24, when the wheel 16 is mounted to the hub 14 and drum 12, and may be flush with the outer face of the wheel 16, but does not project beyond the outer face of the wheel 16 to interfere with fastening of the lug nut 26. Desirably, the sleeve portion 48 provides a relatively snug fit within the bolt hole 24. A clearance of from 0.001 to 0.005 inches from the sides of the bolt hole 24 may be suitable. In some instances, a greater clearance (i.e. over 0.005 inches) may be desirable, however, to facilitate ease of mounting of the wheel 16. The sleeve portion 48 is also provided with a bore 50 that is concentric with and coextensive with the bore 46 to closely receive the bolt 20. The outer edges 52, 54 of the body 44 and sleeve 48, respectively, are also chamfered or beveled to facilitate ease of insertion and to prevent rolling or turning of the edges.

While the insert 32 has particular application to wheel mounting assemblies where the bolt holes are of smaller diameter, wherein relative movement of the bolts 20 within the holes is limited, the insert 42 may be used with wheel assemblies wherein the wheel has bolt holes that have a width or diameter that is substantially larger than the width of the stud or bolt 20. In such wheel assemblies, a significant clearance or space between the bolt 20 and the walls of the bolt hole 24 may exist so that there may be slippage or shifting of the wheel 16 with respect to the hub, which can also throw the wheel and tire out of balance. The sleeve 48 fills this space and prevents relative movement of the bolt 20 within the bolt hole 24 in the same way that the body 44 prevents relative movement of the bolt 20 within the aperture 22. The sleeve 48 also centers the bolt 20 within the aperture.

The insert 42 has particular application for use with wheel assemblies utilizing aluminum wheels, which typically have wider diameter bolt holes than do steel wheels. Steel wheels, which typically have a smaller diameter bolt hole, may employ the insert 32, previously discussed. In the particular embodiment shown, the sleeve 48 has an outer diameter of approximately 1.04 inches±0.005 inches and the bore 50 has a width or diameter of about ⅞ inches±0.005 inches. The outer width or diameter of the sleeve 48 may range, however, from about 0.9 to about 1.2 inches.

In use, the insert 42 is positioned over the stud or bolt 20, with the body 44 being inserted within aperture 22, so that the bolt 20 is centered therein when the drum 12 is mounted over the hub 14. With the body 44 fully inserted within the aperture 22, the sleeve portion 48 extends from the aperture 22. Again, more than one insert 42 may be used for each wheel assembly, as described with respect to the insert 32. The wheel 16 and tire 18 are then mounted to the hub 14 and drum 12, with the studs 20 extending through the bolt holes 24. The sleeve portion 48 of the insert projects and is received within the bolt hole 24 of the wheel 16 and centers the lug or bolt 20 within the hole 24, preventing relative movement therein. The lug nuts 26 are then threaded over the bolts 20 and tightened to secure the wheel 16 in place. The wheel may then be balanced using conventional methods.

The invention provides a means for keeping a drum of a hub-piloted wheel mounting assembly from slipping or shifting, as can occur without the spacing insert, and thus keeps the wheel and tire from being thrown out of balance. The invention also prevents shifting or slippage of the wheel itself where the bolt hole is sufficiently large to permit relative movement of the stud or bolt. The spacing insert is simple in design, easy to use and can be employed with conventional hub-piloted wheel mounting assemblies without alteration or modification of any equipment.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A wheel mounting assembly comprising:
   a hub having at least one bolt extending therefrom;
   a drum having an aperture for receiving the at least one bolt, the aperture having a width that is substantially greater than that of the at least one bolt to thus define an area of space between the bolt and the sides of the aperture; and
   a spacing insert having a body with a bore for closely receiving the at least one bolt, the outer surface of the body being configured to be closely received within the aperture of the drum so that the area of space is generally filled by the spacing insert when positioned therein, and wherein the bore of the spacing insert body is a non-threaded bore.

2. The wheel mounting assembly of claim 1, further comprising:
   a wheel having a bolt hole for receiving the at least one bolt and which mounts to the hub and drum; and wherein
   the spacing insert has a sleeve portion extending from the body, the sleeve portion having a bore for closely receiving the at least one bolt, and wherein the sleeve portion projects and is closely received within the bolt hole of the wheel when, the wheel is mounted to the hub and drum.

3. The wheel mounting assembly of claim 1, wherein:
   the body is generally cylindrical in shape.

4. The wheel mounting assembly of claim 1, wherein:
   the body has a width of from about 1 to about 1.5 inches.

5. The wheel mounting assembly of claim 1, wherein:
   the body has a width of from about 1.1 to about 1.3 inches.

6. The wheel mounting assembly of claim 1, wherein:
   the body has a thickness of from about 0.1 to about 0.5 inches.

7. The wheel mounting assembly of claim 1, wherein:
   the body has a thickness of from about 0.15 to about 0.4 inches.

8. The wheel mounting assembly of claim 1, wherein:
   the bore has a width of from about 0.5 to about 1 inches.

9. The wheel mounting assembly of claim 1, wherein:
   the bore has a width of from about 0.85 to about 0.9 inches.

10. The wheel mounting assembly of claim 2, wherein:
    the sleeve portion has a width of from about 0.9 to about 1.2 inches.

11. The wheel mounting assembly of claim 1, wherein:
    there are at least four bolts, the drum having one aperture for receiving each bolt, and wherein a spacing insert is positioned within each aperture receiving each of the at least four bolts.

12. The wheel mounting assembly of claim 1, wherein:
    there are at least 8 bolts spaced apart in a generally circumferential configuration, and wherein the drum has one aperture for receiving each bolt, and wherein a spacing insert is positioned within at least two of the apertures receiving the bolts.

13. The wheel mounting assembly of claim 1, further comprising:
    at least one fastener which fastens to the at least one bolt to facilitate mounting of a wheel having a bolt hole to the hub and drum; and wherein
    the fastener has a generally flat abutment surface that abuts against the outer surface of the wheel so that no portion of the fastener projects into the bolt hole when the fastener is fastened to the at least one bolt.

14. A device for preventing relative movement of a drum and hub of a wheel mounting assembly, the hub having at least one bolt extending therefrom which extends through an aperture of the drum and a bolt hole of the wheel when the drum and wheel are mounted thereon, the aperture having a width that is substantially greater than that of the at least one bolt thus defining an area of space between the bolt and the sides of the aperture, the device comprising:
    a spacing insert having a body with a bore for closely receiving the at least one bolt, the body being configured to be closely received within the aperture of the drum so that the area of space is generally filled by the spacing insert when positioned therein to thereby restrict relative movement of the bolt within the aperture, wherein the bore of the spacing insert body is a non-threaded bore.

15. The device of claim 14, wherein:
    the spacing insert has a sleeve portion extending from the body, the sleeve portion having a bore for closely receiving the at least one bolt and being configured to be closely received within the bolt hole of the wheel.

16. The device of claim 14, wherein:
    the body is generally cylindrical in shape.

17. A method of preventing relative movement of a drum and hub in a vehicle wheel mounting assembly, the hub having at least one bolt extending therefrom over which the drum is mounted, the drum having an aperture with a width that is substantially greater than that of the at least one bolt to thus define an area of space between the bolt and the sides of the aperture, the method comprising:
    providing a spacing insert formed from a body having a bore for closely receiving the at least one bolt, the body being configured to be closely received within the aperture of the drum, and wherein the bore of the spacing insert body is a non-threaded bore; and
    inserting the body of the spacing insert into the aperture so that the area of space is generally filled by the body when positioned therein to thereby prevent relative movement of the bolt within the aperture.

* * * * *